United States Patent
Zoia et al.

(10) Patent No.: US 6,609,043 B1
(45) Date of Patent: Aug. 19, 2003

(54) METHOD AND SYSTEM FOR CONSTRUCTING A STRUCTURAL FOAM PART

(75) Inventors: Richard F. Zoia, Chino Hills, CA (US); Boris C. Fritz, Redondo Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/558,699

(22) Filed: Apr. 25, 2000

(51) Int. Cl.[7] .............................................. G06F 19/00
(52) U.S. Cl. ...................................... 700/119; 700/182
(58) Field of Search ..................... 700/95–98, 117–120, 700/145, 146, 182, 197, 207, 212; 164/6, 9, 12–15, 34, 520; 264/41, 45.1–45.4, 219–221, 225

(56) References Cited

U.S. PATENT DOCUMENTS

| | | | | |
|---|---|---|---|---|
| 5,340,433 A | | 8/1994 | Crump | 156/578 |
| 5,354,414 A | | 10/1994 | Feygin | 156/630 |
| 5,433,280 A | | 7/1995 | Smith | 175/336 |
| 5,564,064 A | | 10/1996 | Martin | 419/5 |
| 5,573,716 A | | 11/1996 | Jacobson | 264/40.7 |
| 5,593,531 A | | 1/1997 | Penn | 156/272 |
| 5,614,075 A | * | 3/1997 | Andre, Sr. | 205/67 |
| 5,618,633 A | | 4/1997 | Swanson et al. | 428/593 |
| 5,663,883 A | | 9/1997 | Thomas et al. | 364/468 |
| 5,738,817 A | | 4/1998 | Danforth et al. | 264/603 |
| 5,818,718 A | | 10/1998 | Thomas et al. | 364/468 |
| 5,819,388 A | | 10/1998 | Salm | 29/424 |
| 5,819,408 A | * | 10/1998 | Catlin | 29/897.2 |
| 5,824,250 A | * | 10/1998 | Whalen et al. | 264/219 |
| 5,839,329 A | | 11/1998 | Smith et al. | 76/108 |
| 5,847,958 A | | 12/1998 | Shaikh et al. | 364/468 |
| 5,876,550 A | | 3/1999 | Feygin et al. | 156/264 |
| 5,879,489 A | | 3/1999 | Burns et al. | 156/64 |
| 5,900,207 A | | 5/1999 | Danforth et al. | 264/603 |
| 5,932,055 A | * | 8/1999 | Newell et al. | 156/245 |
| 6,354,362 B1 | * | 3/2002 | Smith et al. | 164/332 |
| 2001/0032713 A1 | * | 10/2001 | Penn et al. | 164/34 |

OTHER PUBLICATIONS

Scientific Background (9 pages), from molec.geodesics.com (Jan. 25, 2000).

* cited by examiner

*Primary Examiner*—Maria N. Von Buhr
(74) *Attorney, Agent, or Firm*—Baker Botts L.L.P.

(57) ABSTRACT

A method for constructing a structural foam part. The method comprises three steps. Step one calls for utilizing a rapid prototyping process to create a polymer mold. Step two requires filling the polymer mold with a material. The last step calls for heating the polymer mold and the material to heat set the material and to remove the polymer mold thereby forming the structural foam part. More specifically, the rapid prototyping process may be stereolithography, and the structural foam part may have a varying density such that different mechanical properties exist in different sections of the structural foam part.

52 Claims, 3 Drawing Sheets

METHOD AND SYSTEM FOR CONSTRUCTING A STRUCTURAL FOAM PART

TECHNICAL FIELD OF THE INVENTION

This invention relates generally to the field of materials construction and, more specifically, to a method and system for constructing a structural foam part.

BACKGROUND OF THE INVENTION

Many industries, such as the aerospace, aircraft, ship building, and automotive industries use structural foam. Structural foam is desirable in many industrial applications due to, among other desirable attributes, high strength-to-weight ratios, good energy absorption properties, positive effects on thermal conductivity, and resistance to fire/flame. Most structural foam parts deal with bubble-like formations inside the structural foam part to get the foam effect. These bubble-like formations are generally manufactured by mixing a gas with a material such as a polymer. This process results in a cellular structure that contains mostly closed-cells. In addition, there is no regulated controlled structure to maximize strength with light weight and inexpensive production of complex shapes.

Many industries also use honeycomb structures. Honeycomb structures may be open-cell, and their structure can be regulated to some degree. However, maximizing strength with light weight and inexpensive production of complex shapes using honeycomb structures would be very difficult, time-consuming, and costly. Manufacturing processes used for honeycomb structures, such as the expansion process and the corrugation process, limit the effective and economical use of honeycomb structures in certain applications.

An advantage can be obtained using a rapid prototyping process, which could allow complex shapes to be made automatically from a solid computer-aided design ("CAD") model in the structural hollow form desired. A homogeneous structural foam part with varying density, available both as open or closed cell foams, could be produced. The internal structure would be like a honeycomb shape: semihollow and interconnected. Because of the ever-increasing use of structural foam throughout industry, manufacturers are continually searching for better and more economical ways of forming structural foam parts. Therefore, a need has arisen for a new method and system for constructing a structural foam part.

SUMMARY OF THE INVENTION

In accordance with the present invention, a method and system for constructing a structural foam part is provided that substantially eliminates or reduces disadvantages and problems associated with previously developed methods and systems.

A method for constructing a structural foam part is disclosed. The method comprises three steps. Step one calls for utilizing a rapid prototyping process to create a polymer mold. Step two requires filling the polymer mold with a material. The last step calls for heating the polymer mold and the material to heat set the material and to remove the polymer mold thereby forming the structural foam part.

A system for constructing a structural foam part is disclosed. The system comprises a computer operable to generate a solid CAD model having a corresponding CAD data format, and operable to translate the CAD data format into a CAM data format. A stereolithography process is operable to receive the CAM data format and create a polymer mold that corresponds to the shape of the solid CAD model. A material is used to fill the polymer mold, and a heat source that is coupled to the polymer mold and the material, removes the polymer mold by burning or melting away the polymer thereby leaving a formed structural foam part of heat set material.

Another method for constructing a structural foam part is also disclosed. The method comprises two steps. Step one calls for selecting a material, and step two requires utilizing a rapid prototyping process to create the structural foam part using the material.

An important technical advantage of the present invention is that the entire internal structure can be accessible from the outside. This allows for chemical coatings of the entire internal structure using, for example, electrolysis, electroless metal coating, or chemical vapor deposition ("CVD") to change the chemistry of the internal surface for many new applications.

Another technical advantage of the present invention is that the accessibility of the internal structure would allow a medium such as water or air to circulate inside the entire structure. This could be used for plastic injection molds with an ideal cooling system automatically available in the molds, allowing for faster injection cycles, or as a heat exchanger in aerospace or automotive applications.

An additional technical advantage of the present invention is the effective and economical construction of complex shapes that result in homogeneous structural foam parts with varying density. In other words, structural foam parts can be optimally designed to have more strength in certain sections of the part, and less strength in other sections. These regulated controlled structures would maximize strength and minimize weight and cost. Structural foam parts can also be designed to optimize fluid flow for heating or cooling purposes. These complex parts could be used in a myriad of applications for the aerospace, aircraft, ship building, and automotive industries.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION OF THE INVENTION

The preferred embodiments of the present invention and its advantages are best understood by referring now in more detail to FIGS. 1–4 of the drawings, in which like numerals refer to like parts.

Figure 1:
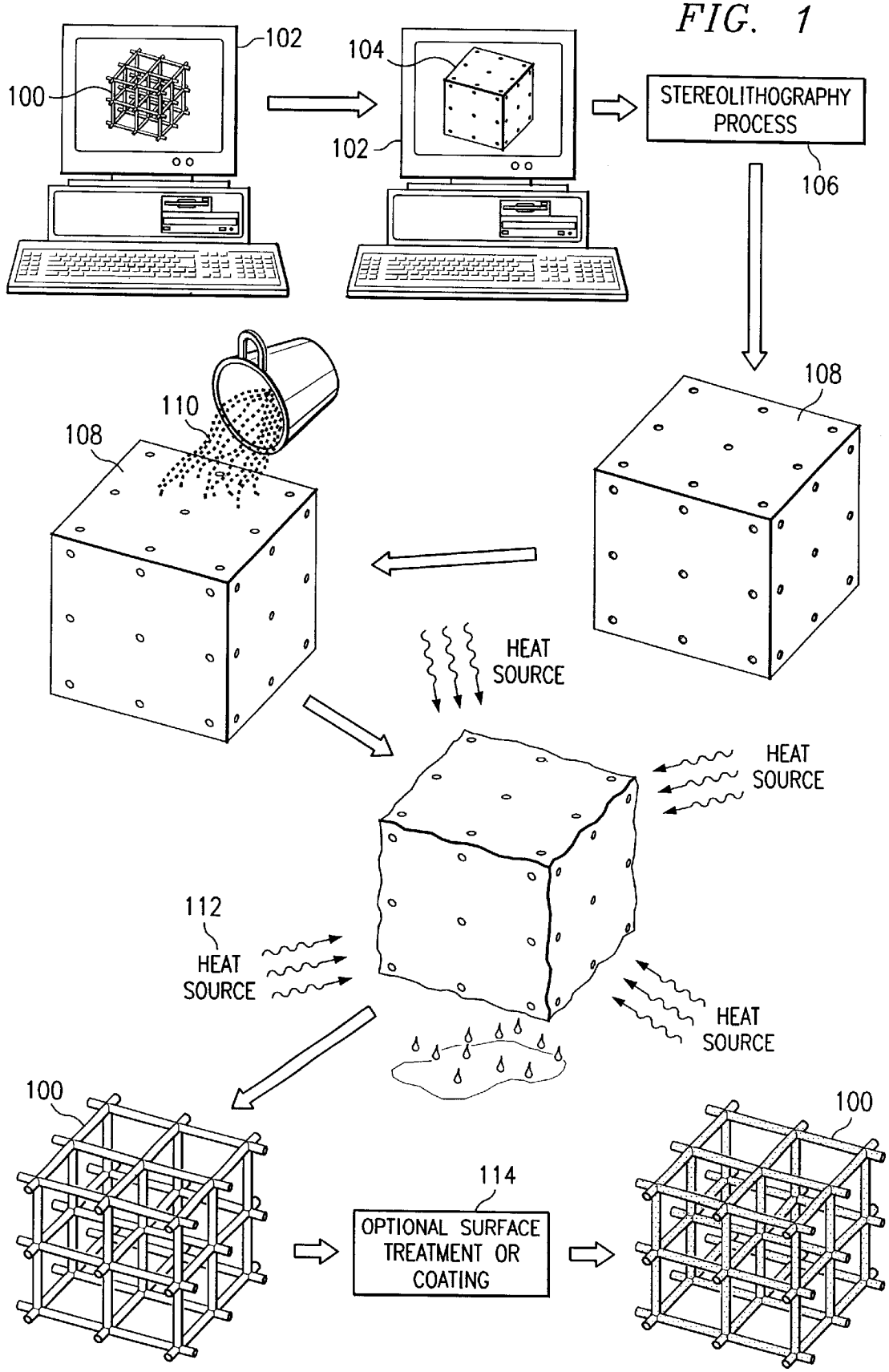
FIG. 1 is a schematic view illustrating one system of constructing a structural foam part in accordance with the present invention.

FIG. 1 is a schematic view illustrating one system for constructing a structural foam part 100 in accordance with the present invention. Structural foam part 100 is used in applications which require high strength-to-weight ratios and open cell internal parts. Structural foam part 100 is similar to a honeycomb structure except that structural foam part 100 of the present invention is designed as a homogeneous structural foam with varying density. In other words, in one section of structural foam part 100 there may be higher strength than in a different section of structural foam part 100. An optimal design could maximize strength and minimize weight and cost. Similarly, an open cell internal structure of structural foam part 100 can be optimally designed depending on what type of heating or cooling arrangement is needed for structural foam part 100.

The system illustrated in FIG. 1 comprises a computer 102, a stereolithography process 106, a polymer mold 108, material 110, and heat source 112. The system may also include a surface treatment process 114 as shown in FIG. 1. Computer 102 is any type of conventional computer having a processor, or processors, capable of executing computer-aided-design ("CAD") and computer-aided-manufacturing ("CAM") software. Computer 102 is initially used to optimally design structural foam part 100. As mentioned previously, structural foam part 100 will be designed for the particular application that structural foam part 100 is contemplated for. This will result in a solid CAD model of structural foam part 100. This solid CAD model has a corresponding CAD data format that results from the design of structural foam part 100. The CAD data format will then be translated into a CAM data format by computer 102. This CAM data format is the mathematical representation of the solid CAD model, and is used by stereolithography process 106 to construct structural foam part 100. As an example, the CAM data format may be a .STL file. In another embodiment, the CAD data of any desired model may be used to create a "build style" in the CAM or a rapid prototyping process that converts the solid CAD model into the required structural foam structure 100 as it is being grown in the rapid prototyping machine.

Before translation into a CAM data format, structural foam part 100 may be converted into a "negative" shape after its initial design. In other words, if structural foam part 100 is thought of as a male part, then the "negative" shape will be the female part. This female part can be thought of as a mold used to make the male part. Whether or not the solid CAD model is structural foam part 100 or the "negative" shape of structural foam part 100, stereolithography process 106 is used to construct polymer mold 108.

Stereolithography process 106 typically comprises a vat of photocurable polymer that cures when subjected to an ultraviolet beam. The photocurable polymer may be many different types of polymers as long as the polymer material can be cured by an ultraviolet beam. The ultraviolet beam hardens the photocurable polymer layer-by-layer until polymer mold 108 is completed. Polymer mold 108 corresponds with the solid CAD model that was designed on computer 102. Polymer mold 108 is built on a build platform that is connected to a servo control system, which allows the platform to be lowered after each successive layer of polymer mold 108 is cured by the ultraviolet beam. Stereolithography process 106 results in very high dimensional accuracy.

Polymer mold 108, after being constructed by stereolithography process 106, may be structural foam part 100 or the "negative" shape of structural foam part 100 as described above. If polymer mold 108 is structural foam part 100, then structural foam part 100 may be subjected to surface treatment process 114, which is discussed below. Structural foam part 100 in this instance, since being made of polymer material, would generally be used for low temperature applications. If structural foam part 100 is the "negative" shape for structural foam part 100, then polymer mold 100 as shown in FIG. 1 is used to construct structural foam part 100 by filling the voids in polymer mold 108 with material 110.

Material 110 may be a ceramic material, a metallic material, a metal filled epoxy liquid molding compound, or other materials. Depending on the type of material and its viscosity, there are many different ways to fill polymer mold 108 with material 110. For example, if a ceramic material is used this ceramic material will typically be in a slurry having low viscosity. This ceramic slurry will be poured over polymer mold 108 and the ceramic slurry will fill the voids under the force of gravity. Alternatively, the ceramic slurry may be pumped into the voids in polymer mold 108 either with a pumping mechanism or by drawing a vacuum. After the ceramic slurry is poured into the voids a drying step would take place to draw out the water that is contained in the slurry, and then the pouring of the slurry is repeated to build up the ceramic material inside the voids. As another example, if a metallic powder as material 110, then the powder will be packed into the voids of polymer mold 108 using any conventional packing method. An additional way of filling the voids in polymer 108 is using chemical vapor deposition ("CVD"). CVD is well known in the art of materials processing.

Once polymer mold 108 is filled with material 110, polymer mold 108 is removed to expose structural foam part 100. This is accomplished by heat source 112 as seen in FIG. 1. Heat source 112 is any conventional heat source, such as radiant heat, blown air (convective) heat, or a heating blanket. Polymer mold 108 then burns off and structural foam part 100 of heat set material 110 results. A typical temperature for heat source 112 can be up to approximately 1800° F. However, other temperatures are contemplated depending on the type of polymer material used. Structural foam part 100 may then go through surface treatment process 114 as shown in FIG. 1.

Surface treatment process 114 may be performed in order to chemically change the surface properties of structural foam part 100. Examples of surface treatment processes 114 are CVD, photo laser CVD, electrolysis, or electroless nickel plating. Whatever surface treatment process 114 is used, this typically will not be a "line-of-sight" process. This ensures that all surfaces of structural foam part 100 are treated the same. This helps the uniformity of the surface properties of structural foam part 100.

Figure 2:
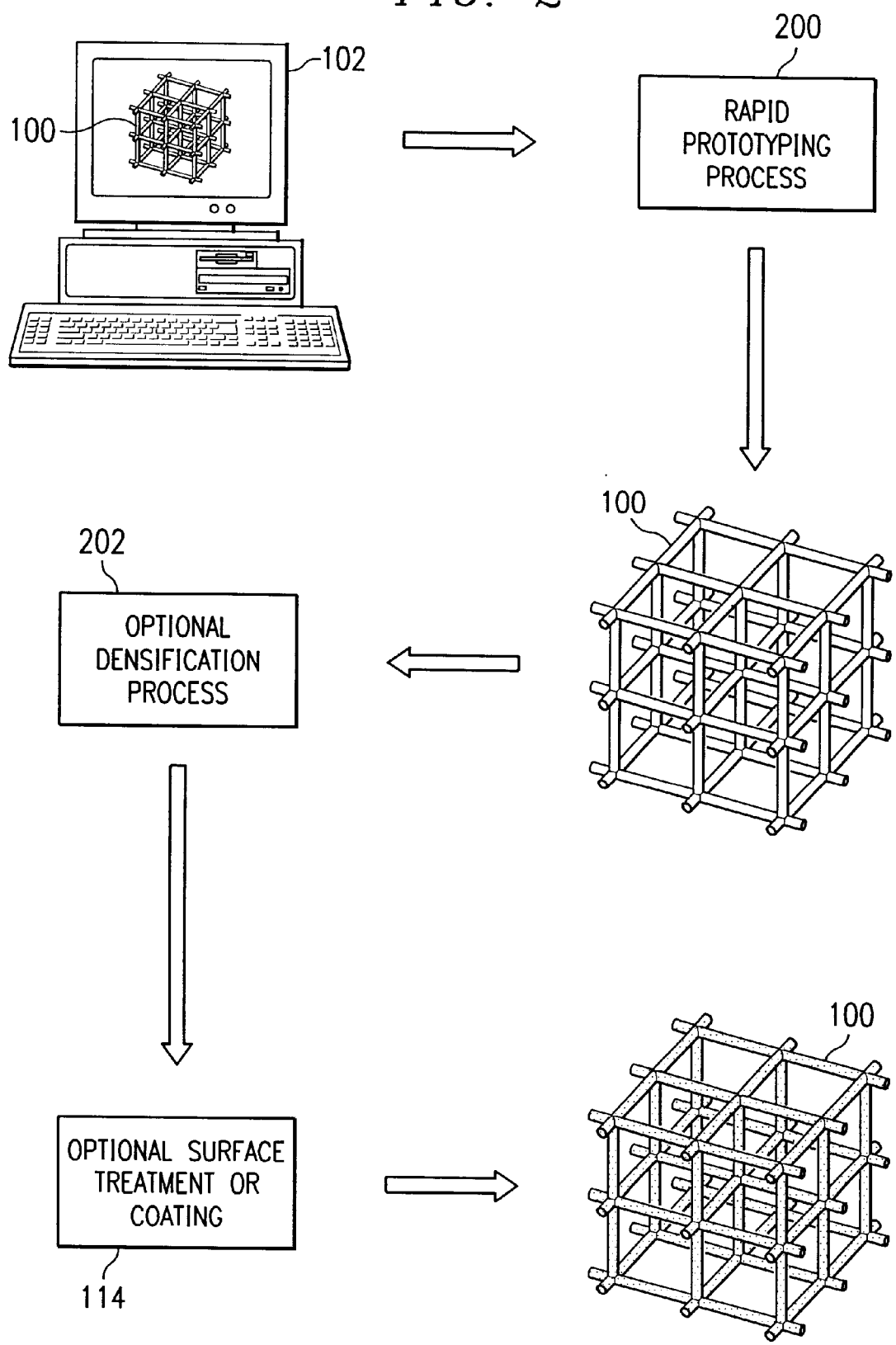
FIG. 2 is a schematic view illustrating another system of constructing a structural foam part in accordance with the present invention.

FIG. 2 is a schematic view illustrating another system for constructing structural foam part 100 in accordance with the present invention. This system comprises computer 102, a rapid prototyping process 200, and material 110. This system may also include a densification process 202 and surface treatment process 114. Computer 102 is as described above, and structural foam part 100 is made directly from the solid CAD model using rapid prototyping process 200. Rapid prototyping process 200 may be stereolithography process 106 as described above, such as when a polymer material is desired for structural foam part 100. This would be in cases of low temperature applications and when high accuracy is desired.

Rapid prototyping process 200 may also be a selective laser sintering ("SLS") process. SLS is a process based on the sintering of powders selectively into a structure. In a typical SLS process a powder is fed into a chamber, and a roller mechanism supplies the powder to a build cylinder. A thin layer of powder is then shaped by a laser beam, which is controlled by a computer, by tracing and sintering a particular cross-section into a solid mass. The powder that is not sintered remains loose and this powder supports the sintered portion. The cycle is repeated until final structural foam part 100 is produced. Many different types of materials 110 can be used in this process such as ceramic powders, steel, titanium or other metal powders with binders or polymer precursors. In addition, this process also allows for nylon material or glass composite nylon material to be used. After the SLS process constructs structural foam part 100, structural foam part 100 can then be densified with more material 110 using densification process 202 as described below. In a particular embodiment of the present invention using SLS, a stainless steel powder with a binder is used to construct structural foam part 100. The binder will then be burned off and the voids remaining will be infused with a bronze or a copper material.

Another rapid prototyping process is fused deposition modeling ("FDM"). A typical FDM machine, and one well known in the art of manufacturing, is an FDM machine made by Stratasys and described in U.S. Pat. No. 5,340,433. In FDM, thermoplastic filaments are fed through a heated extruding head. The thermoplastic melts at a temperature just above its solidification state prior to it being deposited on a build platform to produce a structure. Since polymer materials are used, applications using FDM would normally be low temperature applications. Many different types of thermoplastic materials may be used using FDM.

Another potential rapid prototyping process is a laser-engineered net-shaping ("LENS") process by Optomec. The LENS process would allow for very strong structural foam parts 100 for complex shapes. This process uses metal powders, such as 316 stainless steel, titanium alloys, or nickel based super alloys, without binders so that structural foam parts are net-shape, non-porous, and ready to use. If titanium alloys are used, the LENS process can create fine grain structures that are 30% stronger than wrought or annealed titanium.

Densification process 202 may be used where material 110 is a ceramic powder or a metal powder. Densification process 202 will fuse particles together resulting in a stronger structural foam part 100. Structural foam part 100 may be densified with more of the same type of material before undergoing surface treatment process 114 as described above. In embodiments of the present invention in which ceramic powders or metal powders are used, the applications will generally be high temperature, and where polymer materials are used, the applications will generally be low temperature.

Figures 3, 4:
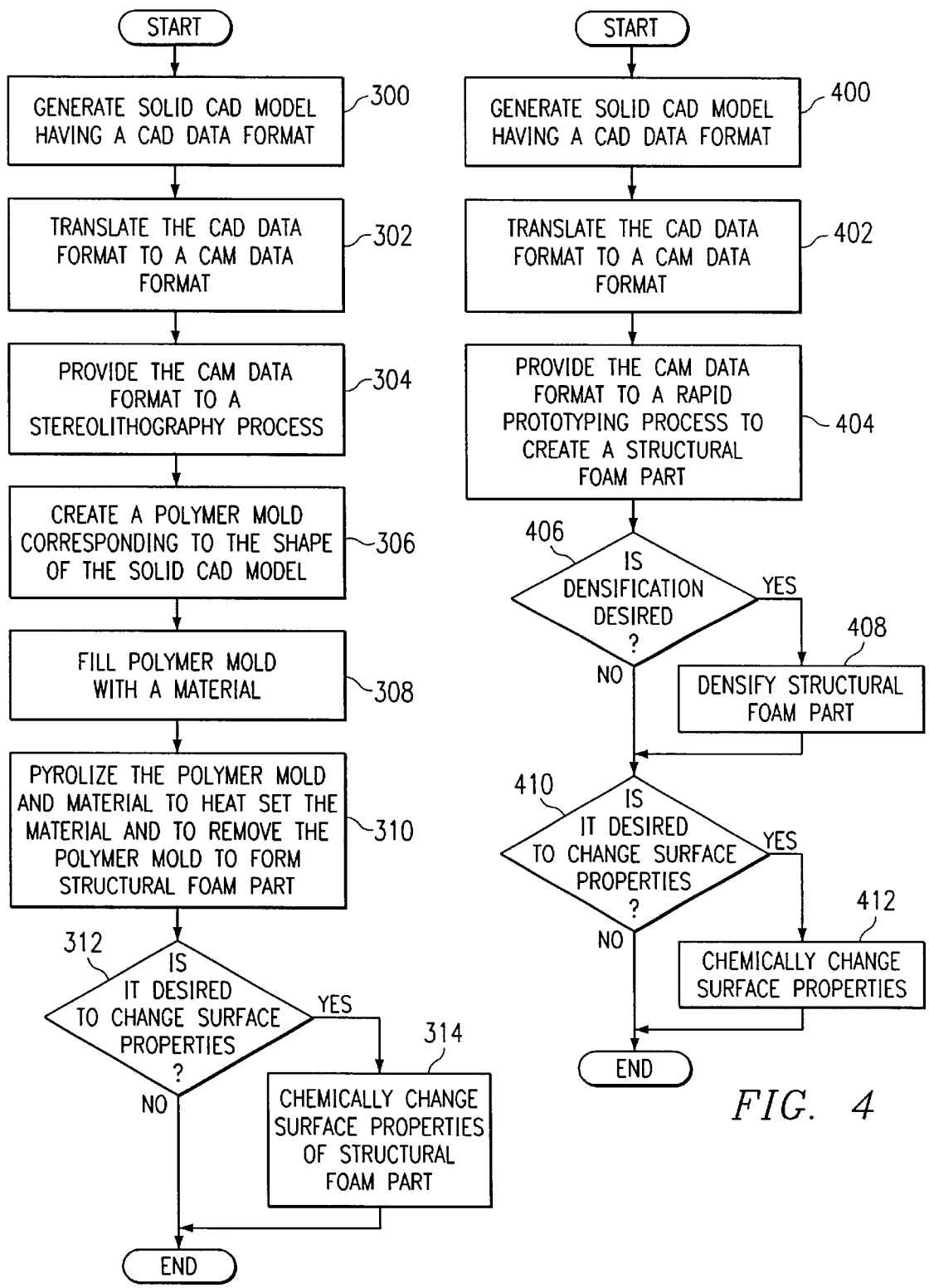
FIG. 3 is a flowchart demonstrating one method of constructing a structural foam part in accordance with the present invention.
FIG. 4 is a flowchart demonstrating another method of constructing a structural foam part in accordance with the present invention.

FIG. 3 is a flowchart showing one method of constructing structural foam part 100 in accordance with the present invention. In one embodiment, a solid CAD model, having an associated CAD data format, is generated by computer 102 at step 300. The CAD data format is translated to a CAM data format at step 302. This CAM data format may be a computer software file such as a .STL file. The CAM data format is then provided to stereolithography process 106 at step 304. Polymer mold 108 is then created at step 306 by stereolithography process 106. Polymer mold 108 corresponds to the shape of the solid CAD model that was generated at step 300. At step 308, polymer mold 108 is filled with material 110. Polymer mold 108 and material 110 are then pyrolyzed to heat set material 110 and to remove the polymer material of polymer mold 108 to form structural foam part 100 at step 310. At step 312, it is determined whether or not a change in surface properties of structural foam part 100 is desired. If a change in surface properties is desired, then the surface properties of structural foam part 100 are chemically changed at step 314, which ends the method. If a change in surface properties of structural foam part 100 is not desired, then the method ends, and structural foam part 100 can be used as desired.

FIG. 4 is a flow chart showing another method of constructing structural foam part 100 in accordance with the present invention. A solid CAD model having a CAD data format is generated at step 400. At step 402, the CAD data format is translated in a CAM data format. This CAM data format is then provided to rapid prototyping process 200 at step 404, so as to create structural foam part 100. At step 106 it is determined whether densification of structural foam part 100 is desired. If densification is desired, then structural foam part 100 is densified at step 408. If densification is not desired, or if densification is carried out at step 408, then the next step is to determine whether or not a change in surface properties of structural foam part 100 is desired at step 410. If a change in surface properties of structural foam part 100 is desired, then the surface properties are chemically changed at step 412, thereby ending the method. If a change in surface properties is not desired at step 410, then the method ends, and structural foam part 100 can be used as desired.

Although an embodiment of the invention and its advantages are described in detail, a person skilled in the art could make various alternations, additions, and omissions without departing from the spirit and scope of the present invention as defined by the appended claims.

What is claimed is:

1. A method for constructing a structural foam part from a polymer mold of the structural foam part, the method comprising:

creating, using a rapid prototyping process, a first layer of the polymer mold, the first layer defining a first cross-sectional layer of the structural foam part;

creating, using the rapid prototyping process, a second layer of the polymer mold, the second layer directly overlying the first layer and defining a second cross-sectional layer of the structural foam part that directly overlies the first cross-sectional layer, wherein the first layer and the second layer each define a different number of internal support structures;

filling the polymer mold with a material; and heating the polymer mold and the material to heat set the material and to remove the polymer mold thereby forming the structural foam part.

2. The method of claim 1 wherein the structural foam part has an open-cell structure that allows access to all of a plurality of voids internally defined by the structural foam part from a single point of access.

3. The method of claim 1 wherein the rapid prototyping process is a stereolithography process.

4. The method of claim 1 wherein the material is a metal filled epoxy liquid molding compound.

5. The method of claim 1 wherein the material is a ceramic.

6. The method of claim 1 wherein the heating step comprises pyrolizing the polymer mold and the material up to approximately 1800° F.

7. The method of claim 1 further comprising chemically changing the surface properties of the structural foam part.

8. The method of claim 7 wherein chemically changing the surface properties of the structural foam part comprises using a chemical vapor deposition process.

9. The method of claim 7 wherein chemically changing the surface properties of the structural foam part comprises using an electrolysis process.

10. The method of claim 7 wherein chemically changing the surface properties of the structural foam part comprises using an electroless nickel plating process.

11. The method of claim 1 wherein the first cross-sectional layer of the structural foam part formed from the first layer of the polymer mold has a mechanical property that is different from those of the second cross-sectional layer of the structural foam part formed from the second layer of the polymer mold.

12. The method of claim 1 wherein the plurality of internal support structures defined by the first layer are unevenly populated.

13. A method for constructing a structural foam part, the method comprising:
selecting a material;
creating the structural foam part by forming from the material a plurality of cross-sectional layers of the structural foam part; and
wherein the plurality of cross-sectional layers are formed layer by layer utilizing a rapid prototyping process.

14. The method of claim 13 wherein the rapid prototyping process is stereolithography.

15. The method of claim 13 wherein the rapid prototyping process is selective laser sintering.

16. The method of claim 15 wherein the structural foam part has an open-cell structure.

17. The method of claim 16 further comprising:
using a stainless steel powder with a binder for the material;
burning-off the binder leaving a porous structural foam part; and
infusing the porous structural foam part with bronze or copper.

18. The method of claim 13 wherein the rapid prototyping process is fused deposition modeling.

19. The method of claim 13 wherein the rapid prototyping process is laser-engineered net-shaping.

20. The method of claim 13 wherein the material is a metal powder.

21. The method of claim 13 wherein the material is a ceramic powder.

22. The method of claim 13 wherein the material is a polymer precursor.

23. The method of claim 13 wherein the material is a nylon.

24. The method of claim 13 further comprising densifying the structural foam part with more of the material.

25. The method of claim 13 further comprising chemically changing the surface properties of the structural foam part.

26. A method for constructing a structural foam part, the method comprising:
generating a solid computer-assisted-design ("CAD") model of the structural foam part, the solid CAD model having a corresponding CAD data format;
translating the CAD data format into a computer-aided-manufacturing ("CAM") data format;
providing the CAM data format to a stereolithography system;
forming a plurality of layers using the stereolithography system, each of the layers defining a corresponding cross-sectional layer of the solid CAD model;
creating a polymer mold of the solid CAD model from the plurality of layers;
filling the polymer mold with a material; and
forming the structural foam part by pyrolizing the polymer mold and the material.

27. The method of claim 26 wherein the material is a metal powder.

28. The method of claim 26 wherein the material is a metal filled epoxy liquid molding compound.

29. The method of claim 26 wherein the material is a ceramic.

30. The method of claim 26 further comprising chemically changing the surface properties of the structural foam part.

31. The method of claim 26, wherein each of the plurality of layers define a plurality of internal support structures of the corresponding cross-sectional layer, and wherein at least one of the plurality of layers represents a more densely populated plurality of internal support structures than those of at least another one of the plurality of layers.

32. A system for constructing a structural foam part, comprising:
a computer operable to generate a solid computer-aided-design ("CAD") model of the structure foam part, the model having a corresponding CAD data format, and operable to translate the CAD data format into a computer-aided-manufacturing ("CAM") data format representing a plurality of cross-sectional layers of the CAD model, each of the cross-sectional layers comprising a plurality of internal support structures;
a stereolithography process operatively coupled to the CAM data format for creating, layer by layer, a plurality of layers of a polymer mold, each of the layers corresponding to a particular one of the cross-sectional layers of the CAD model;
a material for filling the polymer mold; and
a heat source coupled to the polymer mold and the material, wherein the heat source heat sets the material and removes the polymer mold thereby leaving a formed structural foam part.

33. The system of claim 32 wherein the structural foam part is an open-cell structure.

34. The system of claim 32 wherein the material is a metal filled epoxy liquid molding compound.

35. The system of claim 32 wherein the material is a ceramic.

36. The system of claim 32 further comprising a surface treatment process for chemically changing the surface properties of the structural foam part.

37. The system of claim 36 wherein the surface treatment process is chemical vapor deposition.

38. The system of claim 37 wherein chemical vapor deposition is photo laser chemical vapor deposition.

39. The system of claim 36 wherein the surface treatment process is electrolysis.

40. The system of claim 36 wherein the surface treatment process is electroless nickel plating.

41. The system of claim 32, wherein the each of the cross-sectional layers comprises a plurality of internal support structures that are unevenly populated.

42. A system for constructing a structural foam part, comprising:
a computer operable to generate a solid computer-aided-design ("CAD") model having a corresponding CAD data format, and operable to translate the CAD data format into a computer-aided-manufacturing ("CAM")

data format representing a plurality of layers of the structural foam part, each of the layers comprising a plurality of internal support structures; and a rapid prototyping process operatively coupled to the CAM data format for creating the plurality of layers to form the structural foam part, the plurality of layers created from a selected material.

43. The system of claim 42 wherein the rapid prototyping process is stereolithography.

44. The system of claim 42 wherein the rapid prototyping process is selective laser sintering.

45. The system of claim 42 wherein the rapid prototyping process is fused deposition modeling.

46. The system of claim 42 wherein the rapid prototyping process is laser-engineered net-shaping.

47. The system of claim 42 wherein the structural foam part is an open-cell structure.

48. The system of claim 42 wherein the material is a metal powder.

49. The system of claim 42 wherein the material is a metal filled epoxy liquid molding compound.

50. The system of claim 42 wherein the material is a ceramic.

51. The system of claim 42 further comprising a densification process for densifying the structural foam part.

52. The system of claim 42 further comprising a surface treatment process for chemically changing the surface properties of the structural foam part.

* * * * *